US008515302B2

(12) United States Patent
Wilsher

(10) Patent No.: US 8,515,302 B2
(45) Date of Patent: Aug. 20, 2013

(54) CREATING AND INSERTING AN ELECTRONIC CODE SHEET

(75) Inventor: Michael John Wilsher, Letchworth (GB)

(73) Assignee: Xerox Corporation, Norwalk, CT (US)

( * ) Notice: Subject to any disclaimer, the term of this patent is extended or adjusted under 35 U.S.C. 154(b) by 1057 days.

(21) Appl. No.: 12/351,953

(22) Filed: Jan. 12, 2009

(65) Prior Publication Data
US 2010/0177339 A1 Jul. 15, 2010

(51) Int. Cl.
*G03G 15/00* (2006.01)

(52) U.S. Cl.
USPC .......................................................... 399/84

(58) Field of Classification Search
USPC ......................................... 358/1.15; 399/84
See application file for complete search history.

(56) References Cited

U.S. PATENT DOCUMENTS

| | | | |
|---|---|---|---|
| 4,757,348 A * | 7/1988 | Rourke et al. | 399/84 |
| 4,987,447 A * | 1/1991 | Ojha | 399/84 |
| 5,243,381 A | 9/1993 | Hube | |
| 5,655,759 A * | 8/1997 | Perkins et al. | 270/52.02 |
| 5,718,520 A | 2/1998 | MacKay | |
| 6,415,117 B1 | 7/2002 | Bates et al. | |
| 6,965,445 B2 | 11/2005 | Dimperio et al. | |
| 2007/0285675 A1 | 12/2007 | Okada et al. | |
| 2009/0201534 A1* | 8/2009 | Truong | 358/1.15 |

FOREIGN PATENT DOCUMENTS

GB 2355358 A 4/2001

* cited by examiner

*Primary Examiner* — Benny Tieu
*Assistant Examiner* — Eric A Rust
(74) *Attorney, Agent, or Firm* — Hoffmann & Baron, LLP

(57) ABSTRACT

A method, print making device, and system for printing input document sheets as one or more print jobs, including the following steps. First, generating virtual documents with the documents including at least one code sheet and input document sheets. The code sheet(s) include commands for printing encrypted print jobs. Next, reviewing the virtual documents, and identifying a first code sheet. After that, decoding the first code sheet to identify commands for print jobs associated with the first code sheet. Then, printing the virtual documents following the first code sheet. Subsequently, identifying a second code sheet while printing the virtual documents of the first print job. Followed by decoding the second code sheet to identify the commands for printing the print jobs associated with the second code sheet. Lastly, printing the virtual documents following the second code sheet.

8 Claims, 5 Drawing Sheets

CREATING AND INSERTING AN ELECTRONIC CODE SHEET

TECHNICAL FIELD

This disclosure generally relates to a print making device. It more particularly concerns a method for assembling a print job using document sheets and code sheets.

BACKGROUND

High speed electronic copying and print making devices convert original images into image signals or pixels, and in that form process the image signal to provide the desired output, which typically is in the form of copies or prints. Machines of this type naturally are and indeed expected to be highly automated to speed up job production and reduce operator time and involvement to the barest minimum.

Because of their high capacity, speed, and versatility, these machines are particularly suitable for use in central facilities or sites, such as commercial printing establishments, in-plant copying and printing departments. These applications typically queue jobs through all stages of the work process and utilize tools such as "job tickets" to direct the work flow. Job tickets include any bundle of data, associated with image data, that instructs a machine (printer, set of printers, etc.) what to do with the image data. The job ticket itself may never be printed, scanned, or ever reach the real world.

While prior methods for use with a print making device have been successful in completing print jobs, there exists a need for a user friendly method for use with a print making device that provides users with the ability to generate code sheets and insert the code sheets into the document sheets at the selected locations, providing the user with an easy physical representation of the final result instead of a tedious error prone manual entry.

SUMMARY

According to aspects illustrated herein, there is provided a method for printing a plurality of input document sheets as one or more print jobs using a print making device including the following steps. First, generating in series a plurality of virtual documents, with the documents including at least one code sheet and the input document sheets. The code sheet including machine readable code with one or more commands for printing the one or more print jobs being encrypted in the machine readable code. Next, reviewing sheet by sheet the virtual documents, and identifying, from review of the virtual documents, a first code sheet having machine readable code. After that, decoding the machine readable code of the first code sheet to identify the one or more commands for printing the one or more print jobs associated with the first code sheet. Then, printing the virtual documents following the first code sheet which do not include machine readable code based on the one or more commands associated with the first code sheet to define a first print job. Subsequently, identifying a second code sheet having machine readable code, while printing one or more of the virtual documents of the first print job. Followed by, decoding the machine readable code of the second code sheet to identify the one or more commands for printing the one or more print jobs associated with the second code sheet. Lastly, printing the virtual documents following the second code sheet which do not include machine readable code based on the one or more commands associated with the second code sheet to define a second print job.

According to other aspects illustrated herein, there is provided a print making device configured to print one or more print jobs including a scanner, a processor, and a printer. The scanner scans the one or more print jobs, by scanning in series a plurality of virtual documents, with the documents including at least one code sheet and a plurality of input document sheets. The processor reviews each of the virtual documents and identifies a first code sheet of the at least one code sheet. The at least one code sheet includes a machine readable code, the machine readable code includes encryption of one or more commands for printing each of the one or more print jobs. The processor decodes the first code sheet to obtain the one or more commands of a first print job, while the scanner scans the input document sheets following the first code sheet. The printer prints the one or more print jobs, by printing the input document sheets following the first print job based on the one or more commands of the first print job. Then, the processor identifies a second code sheet having machine readable code, while printing the input document sheet of the first print job. Next, the processor decodes the second code sheet to obtain the one or more commands of a second print job, while the scanner continues to scan the input document sheets following the second code sheet. After that, the printer prints the input document sheets following the second code sheet based on the one or more commands of the second print job.

According to other aspects illustrated herein, there is provided a system configured to print one or more print jobs including a print making device. The print making device contains a scanner, a processor, and a printer. The scanner scans the one or more print jobs, by scanning in series a plurality of virtual documents. The documents include at least one code sheet and a plurality of input document sheets. The processor, reviews each of the virtual documents and identifies a first code sheet of the at least one code sheet, the at least one code sheet includes a machine readable code. The machine readable code includes encryption of one or more commands for printing each of the one or more print jobs, and the processor decodes the first code sheet to obtain the one or more commands of a first print job while the scanner scans the input document sheets of the first print job following the first code sheet. The printer prints the one or more print jobs, by printing the input document sheets following the first print job based on the one or more commands of the first print job. Then, the processor identifies a second code sheet having machine readable code, while printing the input document sheets of the first print job. Next, the processor decodes the second code sheet to obtain the one or more commands of a second print job, while the scanner continues to scan the input document sheets following the second code sheet. After that, the printer prints the input document sheets following the second code sheet based on the one or more commands of the second print job.

Additional features and advantages will be readily apparent from the following detailed description, the accompanying drawings and the claims. It is to be understood, however, that the drawings are designed as an illustration only and not as a definition of the limits of the disclosure.

BRIEF DESCRIPTION OF THE DRAWINGS

Like reference symbols in the various drawings indicate like elements.

DETAILED DESCRIPTION

Figure 1:
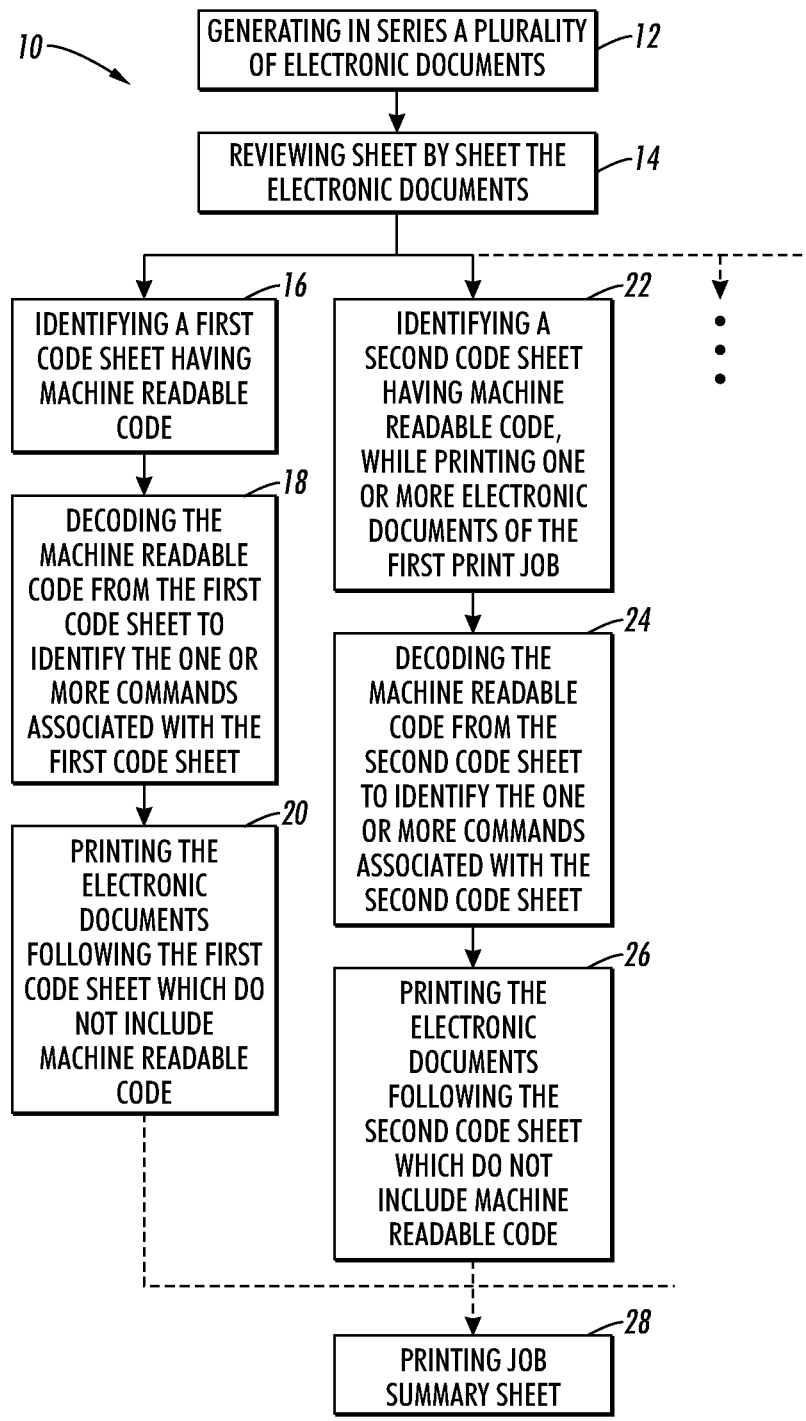
FIG. 1 provides an example method for using code sheets to generate one or more print jobs.

Referring to FIG. 1, an example method is provided for using code sheets to generate one or more print jobs.

As used herein, the phrase "print making device" encompasses any apparatus, such as a digital copier, bookmaking machine, facsimile machine, and multi-function machine, which performs a printing outputting function for any purpose.

As used herein, the phrase "document sheet" encompasses a substrate or a virtual document with text, pictures, or images that a print making device may read and/or reproduce. Examples of a substrate include one or more of a usually flimsy physical sheet of paper, heavy media paper, coated papers, transparencies, parchment, film, fabric, plastic, or other suitable physical print media substrate on which information can be reproduced. Examples of a virtual document include a word document and a portable document format (PDF).

As used herein, the phrase "virtual document" encompasses digital data corresponding to document sheets and code sheets.

As used herein, the phrase "code sheet" encompasses a substrate or a virtual document with machine readable code with one or more commands for a print making device. The code sheet may also include user readable text corresponding to the machine readable code.

As used herein, the phrase "machine readable code" encompasses coding that a machine may read using a scanner, a file reader, or other similar devices to determine information embodied in the coding. An example includes barcodes.

As used herein, the phrase "print jobs" encompasses at least one document sheet and at least one code sheet that a print making device may read and/or reproduce according to commands on the code sheet.

Referring to FIG. 1, an example method 10 for using code pages to generate and print one or more print jobs is provided. The method 10 is designed to delay the normal flow of a print making device to account for extra time required to analyze one or more code sheets and one or more document sheets prior to printing. One way to delay the normal flow is to use electronic pre-collation memory (EPC) to delay the printing by at least one sheet. The EPC provides internal memory to store information scanned or read by the print making device, and while in memory, codes from the code pages are processed and the commands or instructions are then sent to the print making device to print or insert the proper sheet with or without text, pictures, or other images.

The method 10 begins with step 12, generating in series a plurality of virtual documents. The plurality of virtual documents may include at least one code sheet and a plurality of input document sheets. The code sheets may include machine readable code with one or more commands for printing the one or more print jobs being encrypted in said machine readable code. In step 14, the print making device reviews the virtual documents sheet by sheet, and identifies a first code sheet having machine readable code, in step 16.

Then, in step 18, the machine readable code is decoded from the first code sheet to identify the one or more commands associated with the first code sheet. The print making device prints the virtual documents following the first code sheet, which do not include machine readable code in step 20. The virtual documents are printed based on the one or more commands associated with the first code sheet to define a first print job.

After that, in step 22 the print making device identifies a second code sheet having machine readable code, while printing one or more of the virtual documents of the first print job. The machine readable code of the second code sheet is decoded in step 24 to identify one or more commands for printing one or more print jobs associated with the second code sheet. In step 26, the print making device prints the virtual documents following the second code sheet, which do not include machine readable code. The virtual documents are printed based on the one or more commands associated with the second code sheet to define a second print job.

As will be appreciated by those skilled in the art, additional code sheets and print jobs may be utilized. Advantageously, with the method 10, sequential print jobs can be generated without interruption. Particularly, code sheets can be identified while previous print jobs are being printed. Thus, the method 10 provides for a continuous printing process and avoids stopping and starting the printing process between each print job.

Optionally, in step 28, a job summary sheet may be generated at the end of one or more print jobs containing user readable text and machine readable code that summarizes the job. The job summary sheet may be used as a reference to distinguish print jobs and to assist in the loading of paper trays.

A benefit of the method 10 described herein includes the ability for users to easily view exactly where breaks, inserts, or changes in paper are present. Additionally, the above method 10 allows users to easily generate virtual documents by creating print jobs from an arrangement of at least one code sheet and a plurality of input document sheets. The virtual documents may be created electronically by scanning in series the at least one code sheet and the plurality of input document sheets. To prepare for scanning the one or more code sheets may be inserted into the plurality of input document sheets to separate the plurality of input document sheets into one or more print jobs. For example, the code sheets may be initially prepared, printed out, and manually inserted amongst the plurality of input document sheets to separate the input document sheets according to print jobs. Then, the one or more print jobs may be fed into the print making device using automatic document handlers or by being hand fed, depending on the print making device. Further code sheets may be produced on colored paper, for example, making them easy to find in the assembled document.

Alternatively, the one or more code sheets may be electronically inserted into the plurality of input document sheets with user manipulated software. The input document sheets are in electronic format (e.g., by scanning or being initially produced electronically with the code sheets being electronically inserted there amongst). When a user manipulated software is used, the user has the option of printing out the one or more print jobs and feeding the one or more print jobs through the print making device or generating the virtual document with the software and sending the virtual document to the print making device.

Figure 2:
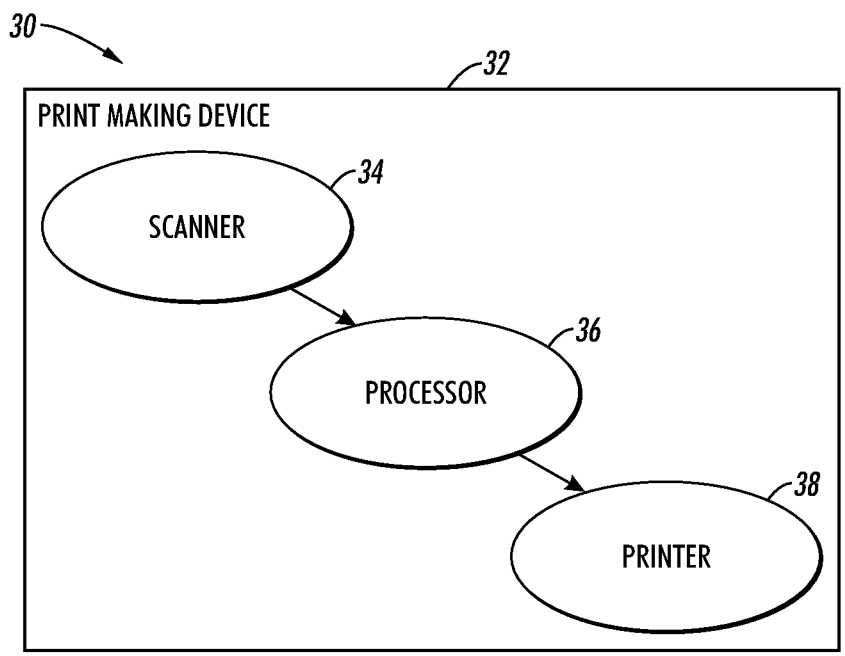
FIG. 2 provides an example of a system for use with the method of FIG. 1.

FIG. 2 provides an exemplary system 30 for use with the method 10 and the one or more code sheets described herein. The system 30 may include a print making device 32 configured to print one or more print jobs. The print making device 32 may further include a scanner 34, a processor 36, and a printer 38.

The scanner 34 is configured to scan the one or more print jobs by scanning in series a plurality of documents to generate a plurality of virtual documents. The plurality of virtual documents may include at least one code sheet and a plurality of input document sheets, the code sheets being located to define the print jobs. The code sheets include machine readable code with encryption of one or more commands for printing one or more print jobs.

The code sheets may be generated electronically by the processor 36 or provided thereto in electronic format (e.g., being generated by a separate processor). The code sheets may be electronically generated, printed out, and manually inserted into the input document sheets at desired locations to define the print jobs. The print jobs may then be scanned in series. As such, a plurality of virtual documents are generated. With continuous feeding of print jobs into the system 30, the plurality of virtual documents are continuous produced in series.

Alternatively, when input document sheets can be initially provided in electronic format, the code sheets may be electronically inserted into the virtual documents at desired locations to separate print jobs; thus, avoiding the need for scanning thereof.

The processor 36 is configured to review each of the plurality of virtual documents and to identify a first code sheet. The processor 36 decodes the first code sheet to obtain the one or more commands of a first print job, while the scanner continues to scan the input document sheets.

The printer 38 is configured to print the one or more print jobs. The printer begins by printing the plurality of input document sheets following the first code sheet based on the one or more commands of the first print job.

The system 30 is configured such that the processor 36 may continuously identify code sheets with machine readable code, while in parallel the printer prints the previous print job. The processor 36 configuration may also continuously decode the code sheets to obtain the one or more commands from the code sheets, while in parallel the scanner scans the input document sheets. The system 30 configuration may operate in the above manner until each code sheet is scanned and decoded and all print jobs are printed.

The code sheets provided in the method 10 may take many forms including a code sheet with robust codes printed on multiple edges of the sheet and both sides of the page, making the system insensitive to the orientation of the code sheets. Additionally, the codes are not limited to barcodes and may include other codes readable by a processor, such as glyphs, block codes or even optical character recognition (OCR) of the printed text. The code sheets may be used in various printing applications because the existence of the code on the code sheets notifies the system that a code sheet is being read. The print making device 32 will then follow the instructions included on the code sheets to prepare a print job.

Figure 3:
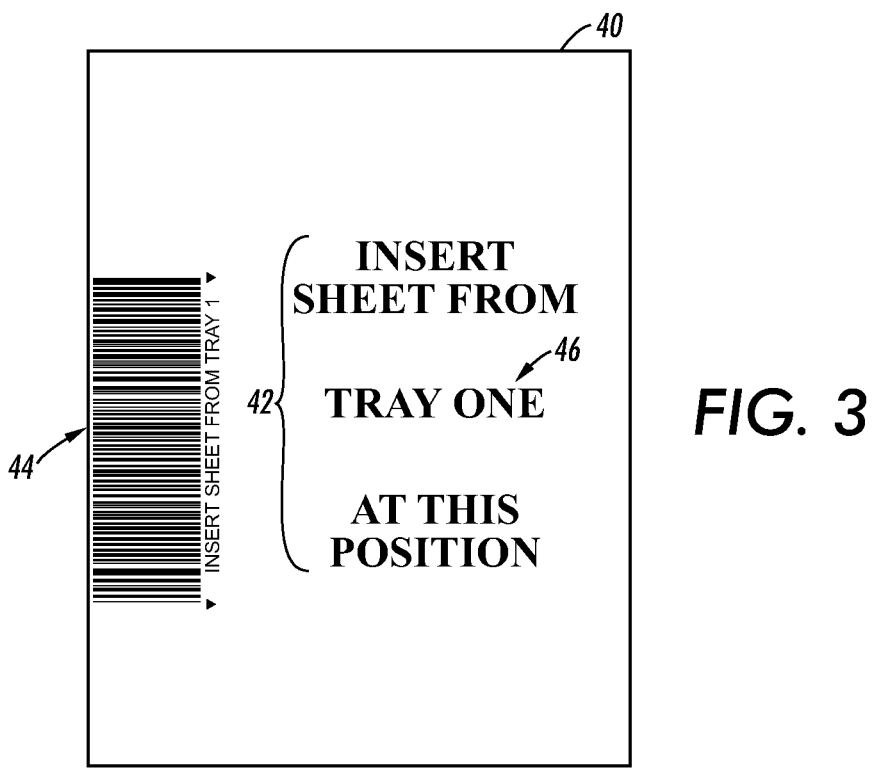
FIGS. 3-4 illustrate examples of code sheets containing user readable text and machine readable code.
Figure 4:
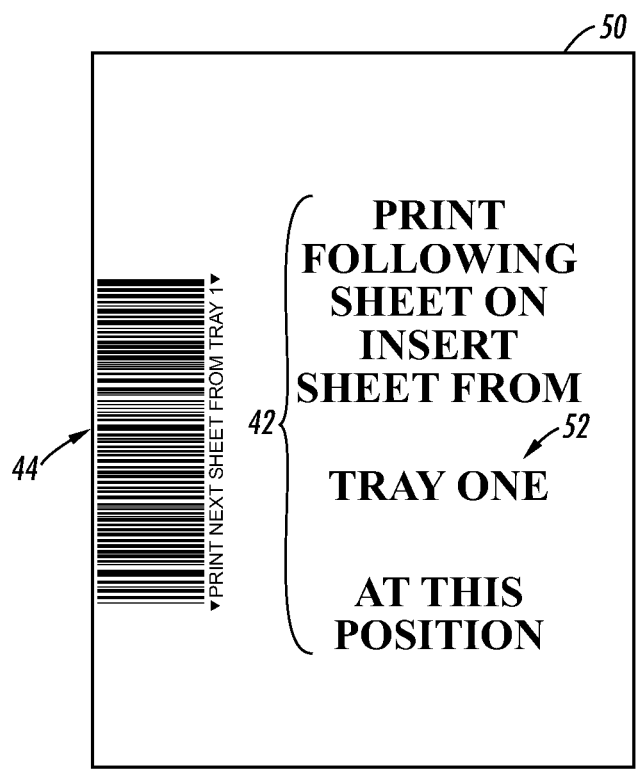

FIGS. 3-4 provide a first code sheet 40 and a second code sheet 50 usable with the method 10 and the system 20, the code sheets 40, 50 may include user readable text 42 and machine readable code 44. The machine readable code 44 provides the print making device 32 with commands for the one or more print jobs associated with, for example, the first or second code sheets 40, 50. The user readable text 42 of the first and the second code sheets 40, 50 assist users when print jobs are being created and/or reviewed because the user readable text 42 provides plain language conveyance of the commands encrypted as machine readable code 44 in the first and second example code sheets 40, 50.

The code sheet 40 of FIG. 3 may contain a command for inserting a blank sheet, or pre-printed into a print job from a specified paper source, such as "TRAY ONE," as indicated at 46. For example, the command to insert a blank sheet as set forth in the first code sheet 40 may be used in a print job to separate documents. In this manner, a blank page can be used to separate print jobs, or portions thereof, without the first code sheet 40 being printed. FIG. 4 provides the second code sheet 50 with commands to print the next input document sheet(s) on paper from a specified paper source, such as "TRAY ONE," as indicated at 52. In this manner, paper size and/or type may be specified. Other examples of commands, which may be included on the code sheets 40, 50 include, but are not limited to, the selection of different mediums of paper for covers, photos, transparencies in one print job including different colors and sizes of paper; changing the mode of the printer for example, between black/white, grayscale, color, and photo mode; reducing/enlarging the size of images on selected pages; changing the print tray used; selecting pages to print one-sided and selecting other pages to print two-sided within the same print job; adding borders, annotation, or other editing features to selected pages; finishing options, such as collating and stapling; and lightening/darkening printing. Further examples of commands which may be included on code sheets 40, 50 to incorporate various options available include, but are not limited to: "print next page using photo mode," "staple after next sheet," and "feed paper from tray 2 for next 3 pages." In fact, almost any machine feature could be controlled via the code sheets.

Figure 5:
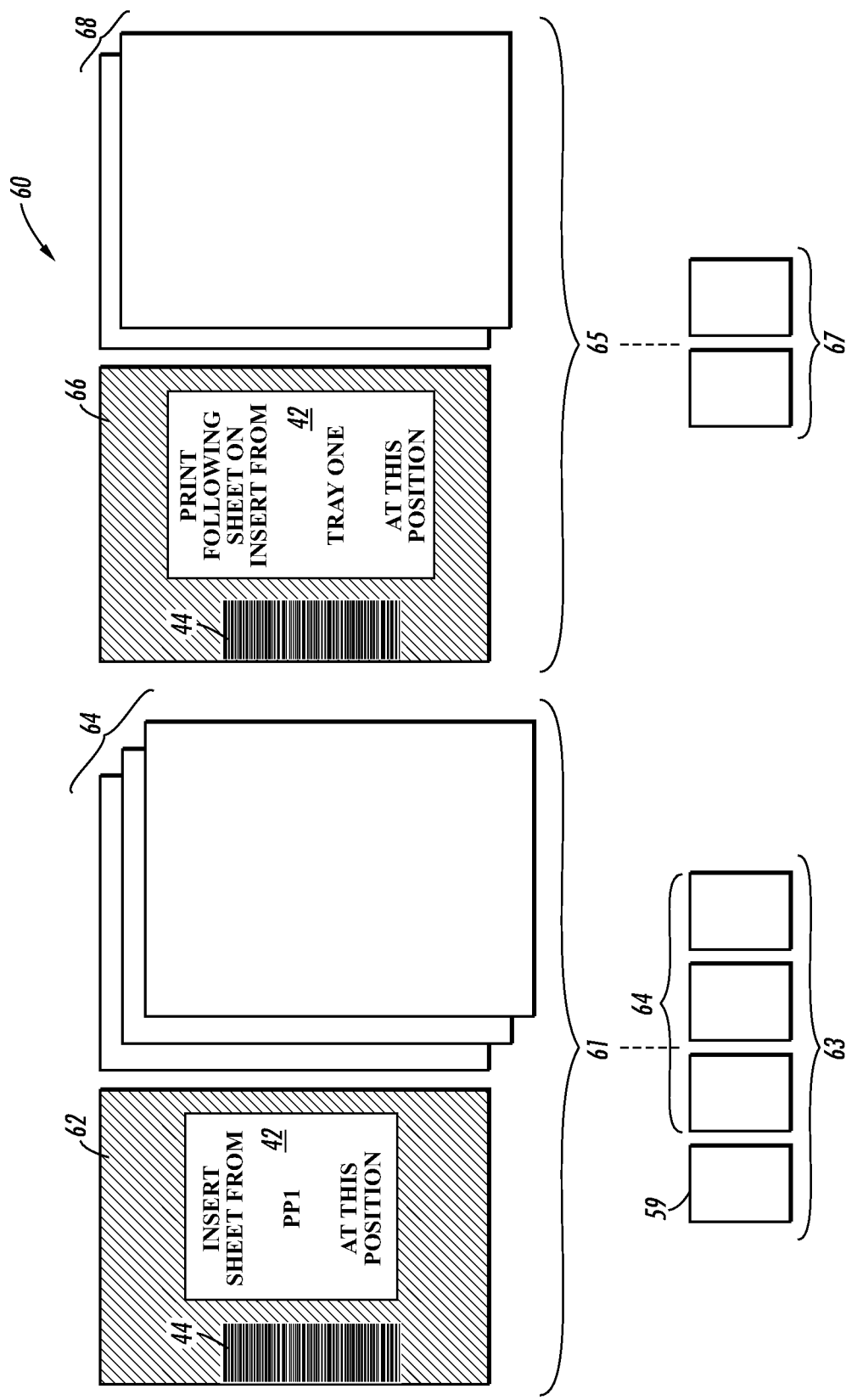
FIG. 5 illustrates a print job containing a combination of code sheets and document sheets arranged to be fed into a print making device.

FIG. 5 depicts a plurality of documents 60, which includes a first group of documents 61, corresponding to a first print job 63, and a second group of documents 65, corresponding to a second print job 67. The documents 60 may be prepared as discussed above. Each print job shall include a code sheet and one or more input documents, which are to be printed. The code sheet provides instructions on how the input documents are to be printed. Thus, the first group of documents 61 includes a first code sheet 62 and a one or more first input document sheets 64.

The first code sheet 62 includes the machine readable text 44 containing commands for the print making device 32 to print output sheets defining a first print job 63. The first print job 63 is prepared based on the first document sheets 64 and the commands contained in the first code sheet 62. The first code sheet 62 may also include a command for inserting a blank sheet 59 from a tray of the system 30, such as tray "PP1" at the position of the first code sheet 62. Note, that the command to insert the blank sheet 59 does not require scanning the blank sheet 59, but instead merely inserts the page from the paper source, avoiding the smudge marks that may result from scanning a blank page. The blank sheet 59 acts as a divider for the first print job 63.

The second group of documents 65 contains a second code sheet 66 with the machine readable text 44 instructing the print making device 32 to print the second input document sheet 68. The commands may include instructions to print on paper from a different source than that used for the first print job 63. Thus, any number of print jobs may be printed in series.

Figure 6:
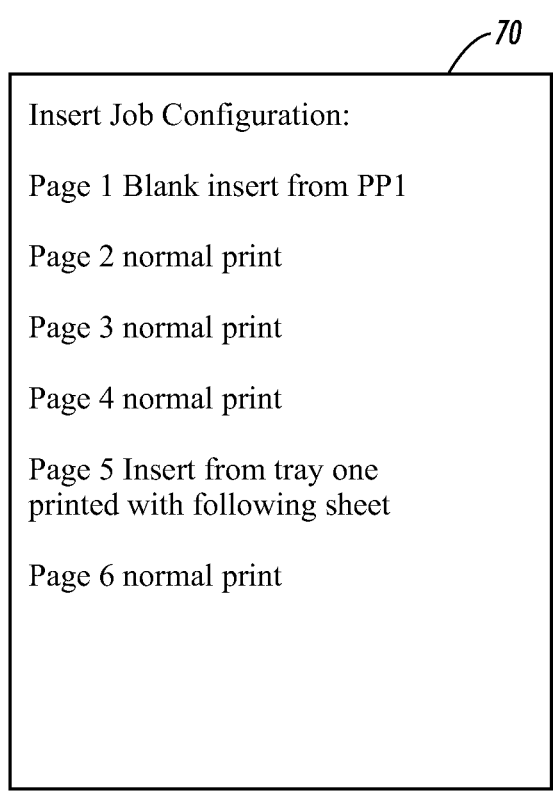
FIG. 6 illustrates an example of a job summary sheet for a print job.

An example job summary sheet 70 for the first and second print jobs 63, 67 of FIG. 5 is provided in FIG. 6. The job summary sheet 70 may summarize the first and second print jobs 63, 67 by indicating the source of paper used for printing each of the input document sheets 64, 68. The job summary sheet 70 for FIG. 5 may contain the following information:

insert a blank sheet 59 from tray "PP1" at Page 1; print Pages 2-4, and 6 normally; and print Page 5 on paper inserted from "TRAY ONE." The summary sheet 70 may include details on other aspects of the printing, such as number of output copies, printing details, finishing details, and so forth.

An additional embodiment of the present invention includes the ability to use a graphical user interface (GUI) on a printer to program a print job using a plurality of input document sheets and not actually generating copies of the individual code sheets. Although this embodiment may take more time to program and require manual programming using the GUI, it still provides the user with a job summary page, which may be inserted into the printer at a later date to replicate the programmed print job.

The advantages of the present invention include the ability to make up a job by simple insertion of bar coded page inserted into a series of original documents as the print job is being processed, not at the end, as previous methods were limited to the end of the print job. The document produced is a good copy of the final result and represents exactly where pages are inserted. The one or more code pages may not only control insert pages but also any other copy functions like tray selection, reduction/enlargement, photo mode, duplex, finishing, etc. A summary sheet may also be produced at the end which simplifies the process of the operator setting up the machine to make additional copies, for example, if the summary sheet is scanned prior to running the job, the machine can flag paper type and setup errors prior to starting the print job.

Additional benefits of the present method include the robustness of the method and the ease of use for both simple and complex print jobs. The method further simplifies the process of setting up a complicated print job that has many varied inserts or settings. Furthermore, the method makes it easier to print repeat print jobs since the job summary sheet and the automatic document feed in a print making device 32 helps users avoid manual entry errors. For additional robustness, the summary sheet could contain a checksum and be "scanned" as part of the job. The checksum would allow the job content and code pages to be checked against the summary sheet for simple verification of the expected job.

It will be appreciated that various of the above-disclosed and other features and functions, or alternative thereof, may be desirably combined into many other different systems or applications. Various presently unforeseen or unanticipated alternatives, modifications, variations, or improvements therein may be subsequently made by those skilled in the art which are also intended to be encompassed by the following claims. In addition, the claims can encompass embodiments in hardware, software, or a combination thereof.

What is claimed is:

1. A method for printing a plurality of input document sheets as one or more print jobs using a print making device comprising the steps of:

generating in series a plurality of virtual documents, said virtual documents including the plurality of input document sheets;

generating electronically using a graphical user interface, separate from the plurality of input document sheets, at least one code sheet including machine readable code with one or more commands for printing the one or more print jobs being encrypted in said machine readable code, said at least one code sheet being electronically inserted in electronic form into the plurality of input document sheets to separate the plurality of input document sheets into the one or more print jobs, wherein said at least one code sheet does not originate from a scanned document;

reviewing sheet by sheet of said virtual documents;

identifying, from review of said virtual documents, a first code sheet having machine readable code;

decoding said machine readable code of said first code sheet to identify said one or more commands for printing a first print job associated with said first code sheet;

printing said virtual documents following said first code sheet which do not include machine readable code based on said one or more commands associated with said first code sheet to define said first print job;

identifying, from review of said virtual documents, a second code sheet having machine readable code, while printing one or more of said virtual documents of said first print job;

decoding said machine readable code of said second code sheet to identify said one or more commands for printing a second print job associated with said second code sheet; and printing said virtual documents following said second code sheet which do not include machine readable code based on said one or more commands associated with said second code sheet to define said second print job.

2. The method of claim 1, further comprising the step of printing a job summary sheet, wherein said job summary sheet includes the machine readable code of the one or more print jobs and a description of the one or more print jobs in a user readable text.

3. The method of claim 1, wherein said one or more code sheets are generated electronically by user manipulated software.

4. The method of claim 1, wherein said plurality of virtual documents are created electronically by scanning in series said input document sheets.

5. The method of claim 1, wherein said graphical user interface being operatively connected to the print making device.

6. The method of claim 1, wherein said one or more commands for printing the one or more print jobs may include one or more of the following selected from the group consisting of: reproducing said input document sheets; inserting a blank document sheet; formatting the one or more print job; assembling the one or more print job; and adding finishing options.

7. The method of claim 1, wherein said one or more code sheets include a user readable text corresponding to said one or more commands encrypted in the machine readable code.

8. The method of claim 1, wherein the machine readable code includes one or more selected from the group consisting of barcodes, glyphs, and block codes.

* * * * *